United States Patent [19]

Beasley

[11] Patent Number: 5,204,682

[45] Date of Patent: Apr. 20, 1993

[54] DOPPLER RADAR SPEED SENSOR

[75] Inventor: Patrick D. L. Beasley, Redhill, England

[73] Assignee: U.S. Philips Corporation, New York, N.Y.

[21] Appl. No.: 834,071

[22] Filed: Feb. 11, 1992

[30] Foreign Application Priority Data

Mar. 22, 1991 [GB] United Kingdom ............... 9106110

[51] Int. Cl.<sup>5</sup> ..................... G01S 13/60; G01S 13/62
[52] U.S. Cl. .................................. 342/117; 342/70; 342/192
[58] Field of Search ........................ 342/117, 70, 192

[56] References Cited

U.S. PATENT DOCUMENTS

| 3,371,341 | 2/1968 | Stavis. | |
|---|---|---|---|
| 4,050,071 | 9/1977 | Clorfeine. | |
| 4,107,680 | 8/1978 | Kaplan | 342/117 |
| 4,389,648 | 6/1983 | Luscombe et al. | 342/192 |

FOREIGN PATENT DOCUMENTS

| 2237139 | 2/1974 | Fed. Rep. of Germany | 342/117 |
|---|---|---|---|
| 2361669 | 3/1978 | France. | |

Primary Examiner—Gilberto Barrón, Jr.
Attorney, Agent, or Firm—Robert J. Kraus

[57] ABSTRACT

A Doppler radar speed sensor for a land vehicle comprises a radar transmitter/receiver circuit (1) coupled to an aerial system (2). R.F. energy from a source (3) is transmitted by the aerial system in forward (9) and backward (10) directions and energy reflected from these directions is mixed with a sample of the transmitted energy in a mixer arrangement (8) to yield a pair of Doppler frequency components representative of the vehicle speed. In order to ensure that these components always have mutually different frequencies, and thereby avoid the necessity of constructing the mixer arrangement as a pair of quadrature-related mixers, the forward and backward directions make different angles ($\theta+\Delta\theta$ and $\theta-\Delta\theta$ respectively) with the direction of travel (15).

8 Claims, 3 Drawing Sheets

DOPPLER RADAR SPEED SENSOR

BACKGROUND OF THE INVENTION

This invention relates to a Doppler radar speed sensor for a land vehicle, comprising a radar transmitter/receiver circuit coupled to a transmit/receive aerial system for transmitting from said aerial system first and second beams of radio signals, derived from a common source, in first and second directions respectively both of which intersect the ground, and for processing reflected said radio signals received by said aerial system from said first and second directions to obtain information about the speed of said aerial system in a third direction which is parallel to the ground, said first and second directions making acute and obtuse angles respectively with a given sense of said third direction, said circuit comprising a mixer arrangement for mixing the received signals with a reference signal derived from said common source to produce a beat signal having a pair of Doppler frequency components the frequencies of which are representative of the speeds of said aerial system in said first and second directions respectively, and B digital data processing means including a spectrum analyser for determining the speed of the aerial system in said third direction from the spectrum of said beat signal.

One known sensor of this general kind is disclosed in EP-A-0371346. The aerial system of this known sensor is mounted beneath the vehicle in such manner that the first and second beams are directed towards the ground in first and second directions which nominally lie in a common plane. (In practice, of course, this ideal situation will not exist, due to the finite widths of B the beams). The plane is nominally vertical (perpendicular to the ground) and extends in the length direction of the vehicle, i.e. in the direction of forward/reverse travel (the "third direction"). The first and second directions lie on opposite sides of the nominal vertical and make equal angles therewith, a so-called "Janus" configuration. Thus one beam is directed forwards at an angle $\theta$ to the horizontal and the other beam is directed backwards also at an angle $\theta$ to the horizontal; one beam makes an angle $\theta$ with the forwards or backwards direction whereas the other beam makes an angle of $180°-\theta$ with the forwards or backwards direction. If at any given time the vehicle has a forward velocity $v_H$ and a downward velocity $v_V$ the Doppler frequency shift of the forwards beam will be $2f_o(v_H \cos \theta + v_V \sin\theta)/c$ and the Doppler frequency shift of the backwards beam will be $2f_o (v_H \cos (180°-\theta)+v_V \sin\theta)/c = 2f_o (-v_H \cos \theta + v_V \sin\theta)/c$, where $f_o$ is the frequency of the radio signals and c is the velocity of light. Thus the result of the mixing process is a beat signal having these Doppler frequency components. It will be evident that, provided $f_o$ and $\theta$ are known, $v_H$ can be calculated by determining the frequencies of these components and subtracting one from the other (thereby eliminating the effect of motion in a vertical direction. More particularly $v_H = c\Delta f_D/(4f_o \cos \theta)$, where $\Delta f_D$ is the difference between the two Doppler frequencies.

In the sensors described in EP-A-0371346 the mixer arrangement comprises a pair of mixers operating in quadrature, i.e. is a dual-phase arrangement. In the sensor shown in FIG. 5 thereof the output signals of the two mixers are applied, after analog-to-digital conversion, to real and imaginary signal component inputs respectively of a Fast Fourier Transform calculating arrangement which, as is known, constitutes in effect a bank of filters and in consequence effectively analyses the mixer output signals into their respective spectral components. The quadrature mixers are employed in order that, in known manner, a distinction can be made between positive and negative frequencies (Doppler frequency shifts of greater and less than zero respectively), the Doppler frequency shifts being effectively folded about zero in each mixer. The cost of such quadrature mixers and of pairs of components, e.g. filters, analog-to-digital converters etc. which may be required in the consequential pair of mixer output signal paths can, however, amount to an appreciable proportion of the cost of the complete sensor, and it is an object of the present invention to alleviate this problem.

SUMMARY OF THE INVENTION

According to the invention a sensor as defined in the first paragraph is characterised in that the sum of said acute and obtuse angles is different from 180° and said mixer arrangement is a single-phase mixer arrangement. (The term "single-phase mixer arrangement" is to be understood to include so-called "balanced" mixer arrangements).

It has now been recognized that it is possible to modify the "Janus" beam configuration used in the prior art sensor in such a manner that the two beams no longer make equal angles $\theta$ with the horizontal without totally destroying an advantage obtained by using a Janus-type configuration in the first place, and that this in turn allows one of the two mixers used in the prior art sensor to be dispensed with together with any components which might have otherwise been required in its particular output signal path. The advantage referred to is that of reduced sensitivity to the effects of tilting of the vehicle. If, for example, the known sensor is tilted forwards through an angle $\Delta\theta$ it can easily be shown that the difference $\Delta f_D$ between the Doppler frequency shifts of the two beams becomes $4f_o (v_H \cos \theta \cos \Delta\theta + v_V \cos \theta \sin \Delta\theta)/c$ where the various symbols have the same meaning as in the preamble. It will be evident that $\Delta f_D$ has only a second-order dependence upon the angle of tilt $\Delta\theta$, which angle can be as much as plus or minus 3° in many vehicles, due to loading, sudden braking, etc. This second-order dependence is maintained even if a permanent "tilt" of $\Delta\theta$ is built into the aiming directions of the two beams so that they no longer make equal angles with the horizontal, albeit at the expense of rendering $\Delta f_D$ no longer independent of the vertical velocity $v_V$. Dependence of $\Delta f_D$ on $v_V$ will not matter unduly in many circumstances, due to $v_V$ being very small relative to most values of vH. Moreover, if time-averaging is permissible this dependence can be eliminated by this means, $v_V$ being, of course, zero on average. Building a permanent "tilt" into the aiming directions of the two beams of the known sensor has the advantage that the absolute values of the Doppler frequency shifts of the two beams due to forwards or backwards motion (which as has just been pointed out will normally be the predominant contributors to the total Doppler shifts) will always be different from each other, enabling these shifts to be individually determined by spectral analysis of the output signal of a single-phase mixer arrangement and without any danger that the two spectral components will cancel each other at the output of the mixer (which could happen if these components had equal frequencies).

BRIEF DESCRIPTION OF THE DRAWING

Embodiments of the invention will now be described, by way of example, with reference to the accompanying diagrammatic drawing figures, in which.

DESCRIPTION OF THE PREFERRED EMBODIMENT

Figure 1:
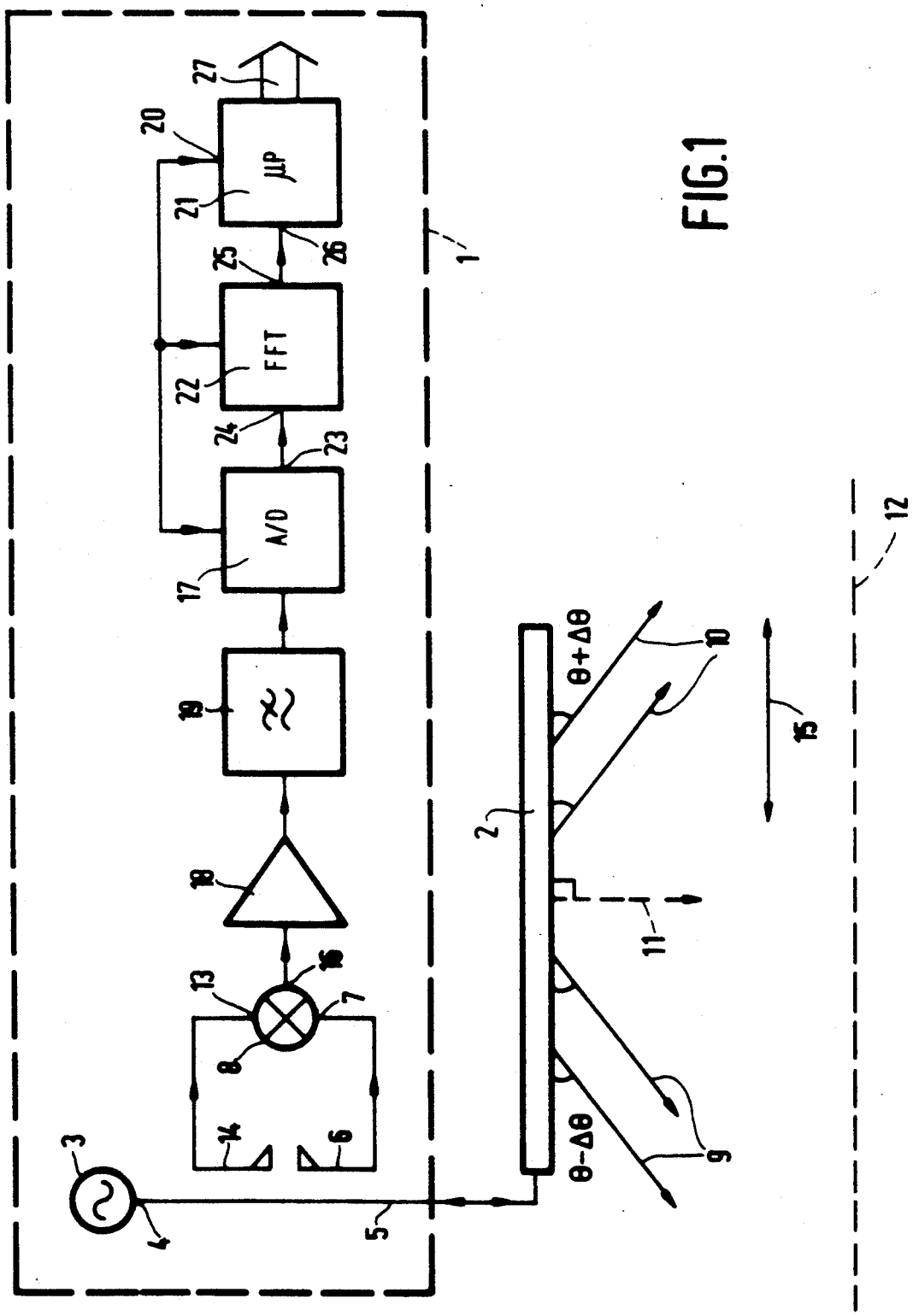
FIG. 1 shows a first embodiment in substantially block diagrammatic form.

In FIG. 1 a Doppler radar speed sensor for a land vehicle comprises a radar transmitter/receiver circuit 1 coupled to a transmit/receive aerial system 2. Circuit 1 includes an R.F. signal source 3 the output frequency $f_o$ of which may be, for example, in the region of 24GHz. The output 4 of source 3 is coupled to the aerial system 2 by means of a feeder 5, part of the output signal of source 3 being taken off by means of a coupler 6 and applied as a reference signal to a first input 7 of a single-phase mixer arrangement 8.

Aerial system 2 produces a beam configuration of the so-called "Janus" type; energy is emitted in first and second directions 9 and 10 respectively which lie in a common plane and on respective sides of an axis 11 which also lies within the common plane. However, in contradistinction to conventional Janus-type aerial systems, the directions 9 and 10 make mutually different angles with the axis 11 and hence also with the ground (denoted by a dashed line 12) when the aerial system 2 is mounted beneath a land vehicle in such manner that the axis 11 points vertically downward. In such circumstances the directions 9 and 10 make angles of $(\theta - \Delta\theta)$ and $(\theta + \Delta\theta)$ respectively with the ground, where $\Delta\theta$ is at least 3°, for example 5°. Thus the sum of the angles which the directions 9 and 10 make with a given sense of a direction 15 which is parallel to both the ground 12 and the plane containing the directions 9 and 10 (the sense directed leftwards in FIG. 1) is the sum of the obtuse angle $(180° - (\theta - \Delta\theta))$ and the acute angle $(\theta + \Delta\theta)$. i.e. $180° + 2\Delta\theta$, and the sum of the angles which the directions 9 and 10 make with the other sense of the direction 15 is the sum of the acute angle $(\theta - \Delta\theta)$ and the obtuse angle $(180° - (\theta + \Delta\theta))$, i.e. $180° - 2\Delta\theta$. Thus the sum of the acute and obtuse angles which the directions 9 and 10 make with either sense of the direction 15 differs by $2\Delta\theta$ from 180°, where $2\Delta\theta$ is at least 6°, for example 10°.

Any of the transmitted energy reflected by the ground back to the system 2 from either of the directions 9 and 10 is coupled to a second input 13 of the mixer 8 via the feeder 5 and a coupler 14. Mixer 8 therefore mixes the reflected signals received from the directions 9 and 10 with the reference signal from source 3 applied to its input 7 to produce a beat signal at its output 16. This beat signal will comprise a pair of Doppler frequency components representative of the speeds of the aerial system 2 in the directions 9 and 10 respectively. If in fact the system 2 is moving with a velocity $v_H$ in the leftwards sense of the direction 15 (which direction may be, for example, the forward/reverse direction of travel of a vehicle in which the sensor 1,2 may be mounted) the frequencies of these components will be $2f_o v_H (\cos(\theta - \Delta\theta))/c$ and $2f_o v_H (\cos(\theta + \Delta\theta))/c$ respectively. Frequency components having these values will also be obtained if the aerial system is moving with the velocity $v_H$ in the other sense of the direction 15. Thus $v_H$ can be calculated in principle from the values $f_{D1}$ or $f_{D2}$ of either of these frequency components, if $f_o$, $\theta$ and $\Delta\theta$ are known:

$$v_H = f_{D1} c/(2f_o \cos(\theta - \Delta\theta)) = f_{D2} c/(2f_o \cos(\theta + \Delta\theta)).$$

However, as pointed out previously, a value for $v_H$ which is much less sensitive to deviations in $\Delta\theta$ from the nominal is obtained if both $f_{D1}$ and $f_{D2}$ are taken into account:

$$2f_o v_H (\cos(\theta - \Delta\theta) + \cos(\theta + \Delta\theta)) = c(f_{D1} + f_{D2})$$

whence $v_H = c(f_{D1} + f_{D2})/(4f_o \cos\theta \cos\Delta)$.

Any deviation in $\Delta\theta$ from the nominal will result in oppositely-directed changes in $f_{D1}$ and $f_{D2}$ so that the effects of these changes on the calculation tend to cancel each other. Both $f_{D1}$ and $f_{D2}$ are accordingly taken into account in the present embodiment and, to this end, the beat signal appearing at the output 16 of mixer 8 is applied to an analog-to-digital converter 17 after amplification in an amplifier 18 and low-pass filtering in a filter 19. Converter 17 is supplied with convert control pulses from an output 20 of a programmed microcomputer 21, these pulses also being applied as clock pulses to a 2N-point Fast Fourier Transform (FFT) calculating circuit 22. The digital data output 23 of converter 17 is connected to the data input 24 of FFT-calculating circuit 22, and the data output 25 of circuit 22 is connected to a data input 26 of microcomputer 21. An output port of microcomputer 21 is denoted by reference numeral 27.

Figure 2:
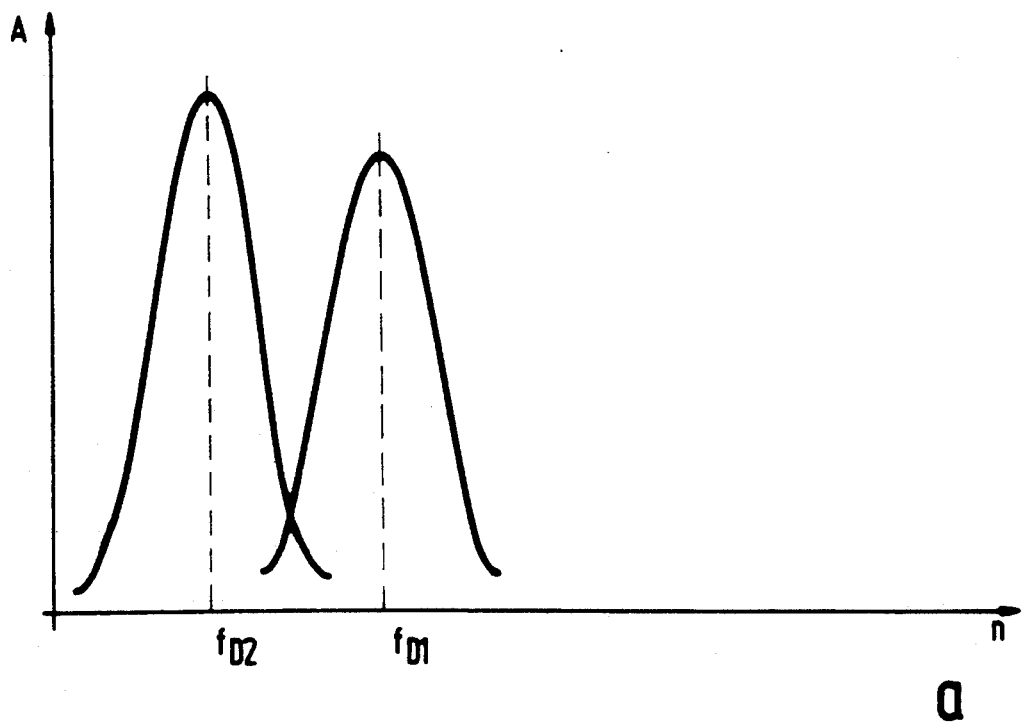
FIGS. 2a and 2b show examples of frequency spectra which a signal in the embodiment of FIG. 1 may exhibit.
Figure 2:
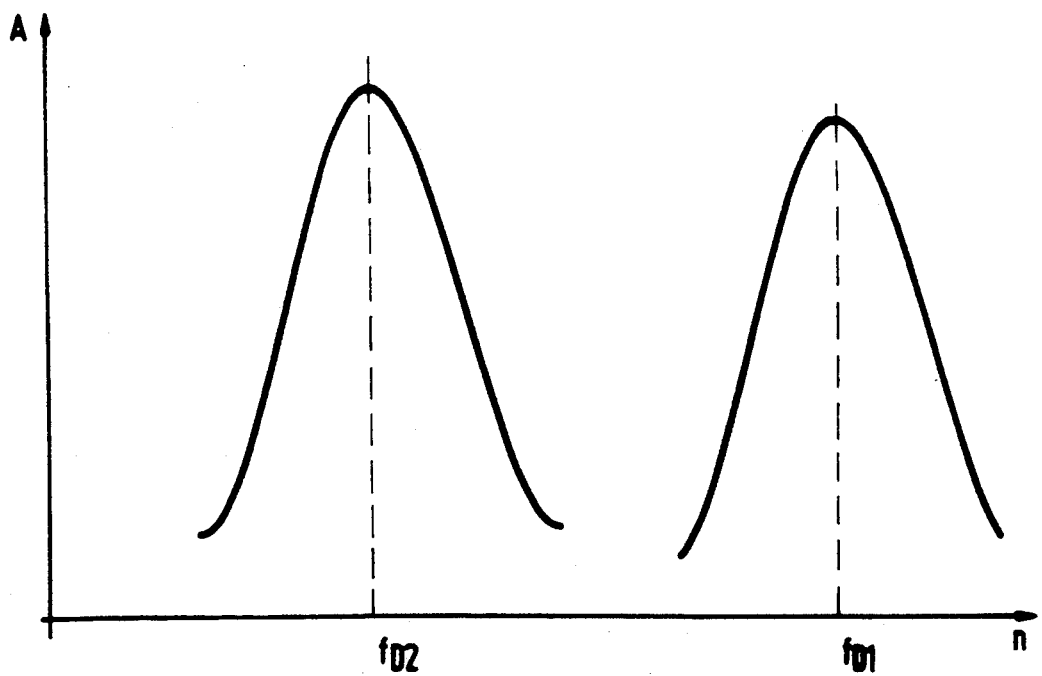

Microcomputer 21 is inter alia programmed to periodically generate a sequence of 2N pulses at its output 20. Each time such a sequence is generated A/D converter 17 supplies a set of 2N digital samples of the amplified and filtered output signal of mixer 8 to the FFT-calculating circuit 22 which, in response, generates an N-point (simple as compared to complex) Fast Fourier Transform thereof at its output 25. As is known, such a Transform in effect constitutes a bank of N filters; the output signal of mixer 8 is effectively spectrally analysed into N frequency ranges. FIGS. 2a and 2b show diagrammatically how the output signal of circuit 22 may appear for comparatively low and comparatively high values of $v_H$ respectively, the amplitude A of each point of the FFT being plotted along the ordinate against the number n of the corresponding point along the abscissa in each case. In both cases the output signal of circuit 22 in effect comprises a pair of peaks centred on the FFT output frequency ranges corresponding to the Doppler frequency shifts $f_{D1}$ and $f_{D2}$ of the beams 9 and 10 respectively of FIG. 1. (Each peak is spread somewhat due to the fact that neither beam 9 nor beam 10 is an ideal pencil beam, but inevitably diverges). The peak due to the beam 9 is of lower amplitude due to the shallower angle of incidence on the ground.

Microcomputer 21 is also programmed to assess each such FFT produced by circuit 22 to determine the corresponding value of $v_H$. To this end it is arranged that its storage includes templates of the FFTs to be expected when $v_H$ has each of N equally spaced values which together cover the complete range of possible values of $v_H$, and that it performs the sequence of steps illustrated in the flow-diagram of FIG. 3 of the drawings each time a new FFT has been produced by circuit 22. The actual formation of the FFTs is also included in the flow diagram of FIG. 3 for completeness.

Figure 3:
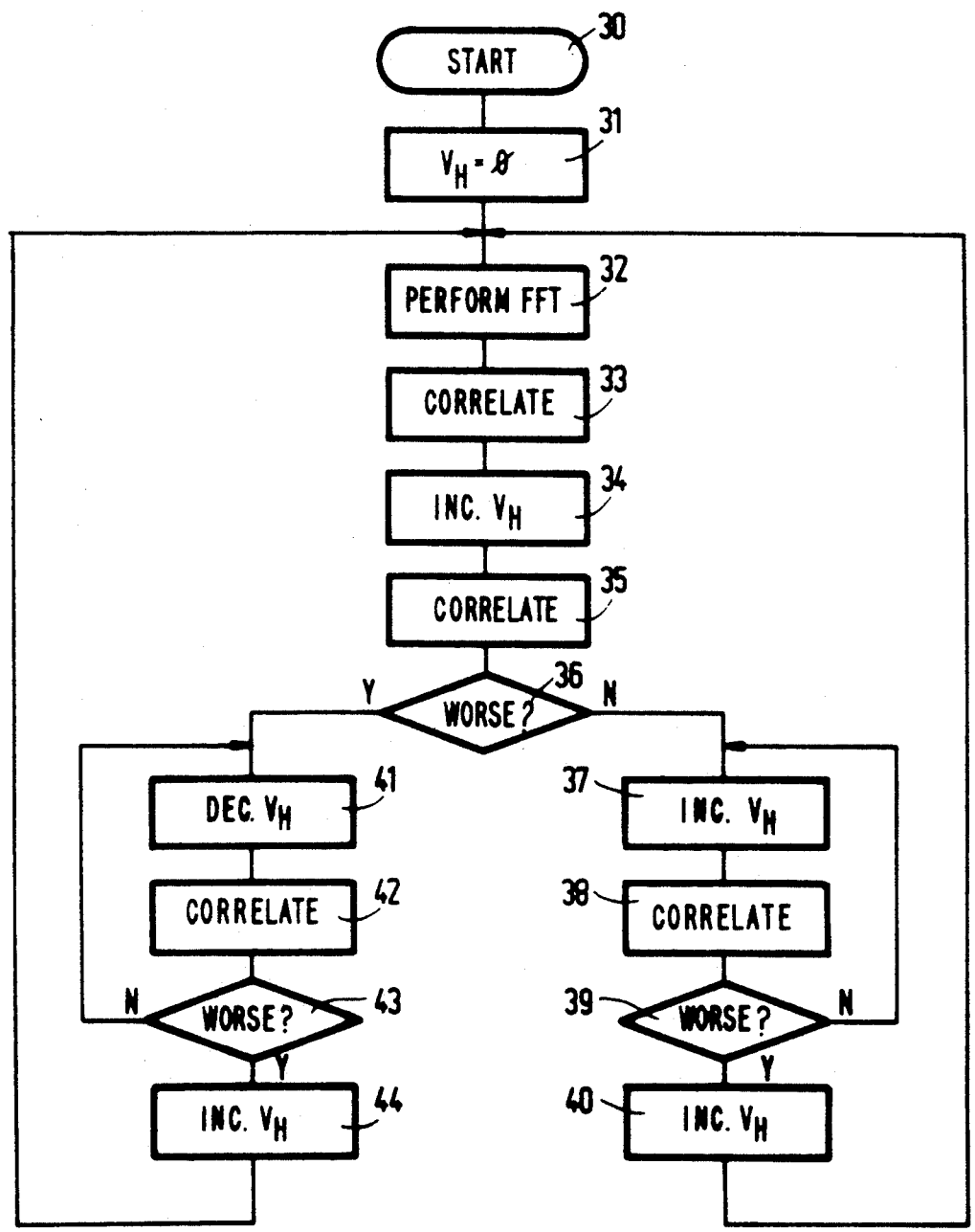
FIG. 3 is a flow diagram illustrating various operations which take place in the embodiment of FIG. 1.

In FIG. 3 the various blocks have the following significances.

30—Start
31—Set assessed speed $v_H$ to zero and output this assessed speed at port 27.
32—Control calculation of new FFT by circuit 22.
33—Calculate correlation coefficient of new FFT with template corresponding to assessed speed.
34—Increment assessed speed.
35—Calculate correlation coefficient of new FFT with template corresponding to latest assessed speed, i.e. result of step 34.
36—Correlation worse?
37—Increment latest assessed speed.
38—Calculate correlation coefficient of new FFT with template corresponding to latest assessed speed, i.e. result of step 37.
39—Correlation worse?
40—Decrement latest assessed speed and output result at port 27.
41—Decrement latest assessed speed.
42—Calculate correlation coefficient of new FFT with template corresponding to latest assessed speed, i.e. result of step 41.
43—Correlation worse?
44—Increment latest assessed speed and output result at port 27.

Thus, at switch-on the current assessed speed is set to zero and this value is outputted at port 27, e.g. for display (step 31). Circuit 22 is then controlled to calculate a new FFT and the correlation coefficient of this with the template corresponding to the latest assessed speed (initially zero) is calculated (steps 32 and 33). Steps 34-36 then determine whether a worse correlation is obtained with the template corresponding to an incremented assessed speed. If this is not the case (N output from test 36) steps 34-36 are effectively repeated at 37-39 until a worse correlation is eventually obtained. When this occurs (Y output from test 39) the latest assessed speed is decremented and the result outputted at port 27 for display etc. (step 40) after which a new FFT is calculated (step 32) and the process repeats. If on the other hand the result of test 36 is positive (Y) steps 41—43 then determine whether a worse correlation is obtained with the templates corresponding to steadily decreasing assessed speeds. When this eventually occurs (Y output from test 43) the latest assessed speed is incremented and the result outputted at port 27 for display etc. (step 44). The net result is therefore that, each time a new FFT is calculated by circuit 22, microcomputer 21 assesses which of the stored templates has the best correlation with it and outputs the corresponding speed at its port 27.

The various templates may be generated by mounting a sample sensor in a vehicle provided with an accurately calibrated speedometer, running the vehicle at each of the relevant speeds, and storing the FFT obtained for each speed.

Instead of including actual individual templates of the FFTs to be expected when $v_H$ has each of the aforesaid N equally spaced values the storage of microcomputer 21 may include merely an exemplary single such template, which is scaled each time by an appropriate factor so that it accords with the relevant assessed speed. This will obviously result in a saving of storage space, each member of the set of templates being generated in such a case only as and when it is required.

In a given application in which the output frequency $f_o$ of the r.f. source 3 of FIG. 1 was in the region of 24GHz, the angle $\theta$ was 35°, and the deviation $\Delta\theta$ was 5°, circuit 22 was controlled to calculate a new 512-point FFT approximately every 100 mS, using a sampling rate of 10 KHz.

If desired the sampling rate of the A/D converter 17, and hence the total frequency range covered by the FFTs calculated by circuit 22, may be increased for higher values of the vehicle speed $v_H$, so that the frequency range covered by the FFTs is adapted to those actually required at relatively low and relatively high speeds respectively.

It is of course not essential to perform the spectrum analysis of the output signal of A/D converter 17 by means of Fast Fourier Transforms. Examples of alternatives are various software packages such as the so-called MUSIC and maximum likelihood (ML) algorithms obtainable from the National Algorithms Groups (NAG) of Oxford University, England. Moreover it is of course not essential to employ templates to determine to which speed a given obtained spectrum corresponds. An alternative is, for example, to determine the positions of the two peaks (c.f. FIG. 1) by calculating the "centres of gravity" of the two corresponding curves.

Many constructions are possible for the aerial system 2 of FIG. 1. For example it may comprise two physically separate sections defining the beams 9 and 10 respectively, as shown diagrammatically, albeit producing symmetrically directed beams, in FIG. 1 of EP-A-0371346. Alternatively it may comprise a single array of suitably spaced microstrip line radiators as also disclosed in EP-A-0371346, mounted at an angle $\Delta\theta$ to the horizontal. Preferably, however, it comprises a single planar array of radiators, for example a row of slots in a waveguide, which is constructed in such manner that, even though it is mounted nominally horizontally, it defines a pair of beams which make different angles with the horizontal. If a linear array of n slots is provided along but displaced from the centre-line of one face of a straight rectangular waveguide at a pitch d, one end of the waveguide being closed and the guide being energized at the other end with r.f. energy which has a free space wavelength $\lambda$ and a wavelength $\lambda g$ in the guide, it can be shown that beams of r.f. energy are emitted in a common plane but at angles $\theta_1$ and $180° - \theta_2$ respectively to the direction of transmission of the energy in the guide, where $$\cos \theta_1 = \lambda/\lambda g$$

and $d/\lambda g + (d/\lambda) \cos \theta_2 = 1$.

Given the standard formula
$$\lambda/\lambda g = (1 - (\lambda_0/\lambda_o)^2)^{\frac{1}{2}}$$

where $\lambda_o$ is the cut-off wavelength of the waveguide:

$$\cos \theta_1 = (1 - (\lambda/\lambda_o)^2)^{\frac{1}{2}}$$

and $(d/\lambda)(1 - (\lambda/\lambda_o)^2)^{1/2} + (d/\lambda) \cos \theta_2 = 1$ or $\cos \theta_1 + \cos \theta_2 = \lambda/d$.

Thus the angles $\theta_1$ and $\theta_2$ can be given the desired values by a suitable choice of waveguide, frequency of the r.f. energy employed, and slot pitch d. A particular such construction for the aerial system 2 for use with r.f. energy having a frequency of 24.2 GHz ($\lambda=0.0124$ m) comprised a section of WG20 waveguide ($8\theta_o=0.0213$ m) 20 cm long provided in one face with a row of 25 slots at a pitch d of 7.21 mm. Substitution of these values of $\lambda, \lambda_o$ and d in the equations quoted above will reveal that r.f. energy was emitted at angles of $\theta_1$ and $180°\theta_2$ to the direction of transmission of the r.f. energy in the guide, where $\theta_1 = 35.6°$ and $\theta_2 = 25.0°$.

Thus $\theta$ and $\Delta\theta$ as defined hereinbefore had values of 30.3° and 5.3° respectively. The use of 25 slots resulted in a one-way 3dB beam-width of 6.2° within the plane of the beams. In a direction normal to this plane the 3 dB beam-width was large (about 100°) so that a flared horn about 6 cm deep was fitted to narrow the beams in this direction.

Although as described the plane containing the beams 9 and 10 and the axis 11 of FIG. 1 is perpendicular to the ground 12, it will be evident that this is not essential, provided that this plane is parallel to the direction 15 in which speed is being measured. If the said plane is at a different angle to the ground then this will result merely in a reduced amplitude of the reflected r.f. energy, the components of motion in the direction 15 as seen in the directions of the beams 9 and 10 remaining the same.

From reading the present disclosure, other modifications will be apparent to persons skilled in the art. Such modifications may involve other features which are already known in the design, manufacture and use of Doppler radar speed sensors and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A Doppler radar speed sensor for a land vehicle, comprising a radar transmitter/receiver circuit coupled to a transmit/receive aerial system for transmitting from said aerial system first and second beams of radio signals, derived from a common source, in first and second directions respectively both of which intersect the ground, and for processing reflected said radio signals received by said aerial system from said first and second directions to obtain information about the speed of said aerial system in a third direction which is parallel to the ground, said first and second directions making acute and obtuse angles respectively with a given sense of said third direction, said circuit comprising a mixer arrangement for mixing the received signals with a reference signal derived from said common source to produce a beat signal having a pair of Doppler frequency components the frequencies of which are representative of the speeds of said aerial system in said first and second directions respectively, and digital data processing means including a spectrum analyser for determining the speed of the aerial system in said third direction from the spectrum of said beat signal, wherein the sum of said acute and obtuse angles is different from 180° and said mixer arrangement is a single-phase mixer arrangement.

2. A sensor as claimed in claim 1, wherein said sum is at least 6° different from 180°.

3. A sensor as claimed in claim 1, wherein said aerial system comprises a length of rectangular waveguide provided with a single row of slots in a face thereof, the row of slots extending in the length direction of the waveguide but being displaced from the centre-line of said face, one end of the length of waveguide being coupled to an output of said common source and to an input of the mixer arrangement and the other end being closed, the length direction of the waveguide coinciding with said third direction.

4. A sensor as claimed in claim 2, wherein said aerial system comprises a length of rectangular waveguide provided with a single row of slots in a face thereof, the row of slots extending in the length direction of the waveguide but being displaced from the centre-line of said face, one end of the length of waveguide being coupled to an output of said common source and to an input of the mixer arrangement and the other end being closed, the length direction of the waveguide coinciding with said third direction.

5. A sensor as claimed in claim 1, wherein the digital data processing means includes means for correlating the spectrum of said beat signal with respective members of a set of templates each of which corresponds to a respective speed in said third direction.

6. A sensor as claimed in claim 2, wherein the digital data processing means includes means for correlating the spectrum of said beat signal with respective members of a set of templates each of which corresponds to a respective speed in said third direction.

7. A sensor as claimed in claim 3, wherein the digital data processing means includes means for correlating the spectrum of said beat signal with respective members of a set of templates each of which corresponds to a respective speed in said third direction.

8. A sensor as claimed in claim 4, wherein the digital data processing means includes means for correlating the spectrum of said beat signal with respective members of a set of templates each of which corresponds to a respective speed in said third direction.

* * * * *